United States Patent Office 2,769,839
Patented Nov. 6, 1956

2,769,839

PREPARATION OF MERCAPTO AMINES

John K. Fincke, Dayton, Ohio, assignor to Monsanto Chemical Company, St. Louis, Mo., a corporation of Delaware No Drawing. Application June 23, 1950,
Serial No. 170,039

5 Claims. (Cl. 260—570.5)

The present invention relates to methods of preparing mercapto amines and deals more particularly with the preparation of certain S-substituted 2-mercaptoalkylamines.

The invention provides an improved, technically feasible method for the preparation of mercapto amines having the general formula $$\text{R—S—CH}_2\text{CHNH}_2$$
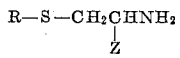

in which R is a member of the class consisting of alkyl, aryl, aralkyl and alicyclic radicals of from 1 to 18 carbon atoms and Z is a member of the class consisting of hydrogen and the methyl radical.

Mercapto amines having the above formula are generally known compounds which have been of especial interest as intermediates in the preparation of barbiturates, local anesthetics and other pharmaceuticals. They are also of potential value to industry as lubricant additives, anti-corrosive agents, anti-oxidants, insecticides, herbicides, etc., but their use in these fields has been hindered by difficulties entailed in their preparation. Previous methods for their production have involved the use of scarce materials and have also, very often, resulted in poor yields. Thus, S-substituted 2-mercaptoethylamines or their N-alkyl derivatives have been prepared by reaction of mercaptans or sodium mercaptides with 2-bromoethylamine hydrobromide, by the addition reaction of mercaptans with ethylenimine, by condensation of mercaptans with phthalimidoethylbromides and subsequent decomposition of the condensation product, and by reaction of dialkylaminoalkyl halides with 2-aminoethylisothiouronium hydrobromide.

Now I have found that good yields of the S-substituted 2-mercaptoethylamines may be obtained by ammonolysis of the S-substituted 2-mercaptoethyl halides substantially according to the scheme

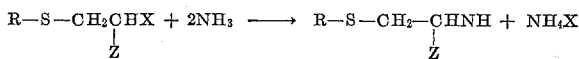

in which R is a member of the group consisting of alkyl, aryl, aralkyl and cycloalkyl radicals of from 1 to 18 carbon atoms, Z is a member of the group consisting of hydrogen and the methyl radical and X is a member of the class consisting of chlorine and bromine. The halides which are employed in the ammonolysis are readily available, for example, by reaction of a mercaptan with ethylene oxide or propylene oxide to yield the correspondingly S-substituted 2-mercaptoethanol or the S-substituted 2-mercaptoisopropanol, respectively, and the reaction of the mercapto alkanol with a halogenating agent such as thionyl chloride, thionyl bromide, hydrochloric acid, and hydrobromic acid. Because the mercaptans, the alkylene oxides and the halogenating agents are readily available materials and because the conversion from mercaptan to mercapto alkanol to mercapto halide proceeds smoothly and in good yields, the present process, involving simple ammonolysis of the terminal halogen provides an easy, commercial method for the preparation of the hitherto difficultly available mercapto amines.

While ammonolysis of halides is a frequently employed method for the production of the amines, in the present instance, it could not have been predicted to afford a satisfactory method for the preparation of S-substituted 2-mercaptoethylamines because the —S—CH₂CH₂Cl group is known to decompose readily in the presence of strong basic materials with cleavage of hydrogen halide. Hence, while reaction of a weak base such as benzylamine with 2-(alkylmercapto)ethyl halides has been found to proceed with the formation of N-benzyl-2-(alkylmercapto)ethylamines (see Dawson, J. Amer. Chem. Soc. 55, 2073 (1933) ), the attempted preparation of compounds like 2-[-2(diethylamino)mercaptoethyl]ethylamine and 3-[2-(diethylamino)ethylmercapto]propylamine by action of ammonia or hexamethylenetetramine, both strong bases, on the corresponding halides has been found to be unsatisfactory (see Clinton et al., J. Amer. Chem. Soc. 67, 594 (1945) ). Accordingly, as stated above, the methods previously employed for the preparation of S-substituted mercaptoethylamines have been indirect and costly.

Now I have found that when operating according to certain reaction conditions which will be hereinafter defined, S-substituted 2-mercaptoethyl or 2-mercaptoisopropyl bromides or chlorides are readily acted upon by ammonia with replacement of the halogen atom by an amino radical to give compounds having the general formula

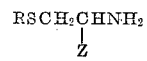

in which R is a member of the class consisting of alkyl, aryl, aralkyl and alicyclic radicals of from 1 to 18 carbon atoms and Z is a member of the class consisting of hydrogen and methyl radicals.

One class of compounds obtainable by the present process includes 2-(alkylmercapto)ethylamines having the formula

in which Alk denotes an alkyl group of from 1 to 18 carbon atoms e. g., 2-(methylmercapto)ethylamine, 2-(isobutylmercapto)ethylamine, 2 - (decylmercapto) e t h y l - amine, etc.

Another class of mercapto amines obtainable by the present process comprises the alkylmercaptoisopropylamines having the formula

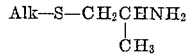

in which Alk is as defined above, e. g., 2-(ethylmercapto)-isopropylamine, 2-(n-octylmercapto)isopropylamine, 2-(octadecylmercapto)isopropylamine, etc.

Arylmercapto amines are likewise obtainable by the present process. These have the general formula

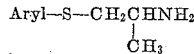

in which Aryl denotes an aryl radical of from 6 to 12 carbon atoms, e. g., 2-(phenylmercapto)ethylamine, 2-(1-naphthylmercapto)isopropylamine, 2-(4-xenylmercapto)-ethylamine, etc.

There may also be prepared aralkylmercapto amines having the formula

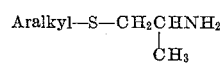

in which Aralkyl denotes an aralkyl radical of from 7 to 18 carbon atoms, e. g., 2-(benzylmercapto)ethylamine, 2-[ (2 - phenylethyl)mercapto]isopropylamine, 2 - [2 - (3- tolyethyl)mercapto]ethylamine, 2 - [ (4-dodecylphenyl)-mercapto]ethylamine, etc.

The S-substituent may be an alicyclic radical, e. g., the cyclopentyl, cyclohexyl, or the tetrahydronaphthyl radical.

Reaction of the S-substituted mercaptoethyl or mercaptoisopropyl bromide or chloride with ammonia for the preparation of the mono-substituted amines is effected by treating the halide with a molar excess of ammonia under superatmospheric pressure. Use of lower quantities of ammonia also results in the formation of the mono-substituted amines, but there are also formed considerable quantities of the di- and tri-substituted amines. While the temperatures and pressures employed in the ammonolysis may be somewhat varied, depending upon the nature of the halide component, I have found that good conversion to the amine occurs when operating at temperatures of from, say, 60° C. to 150° C., at pressures of up to about 4000 p. s. i. The period of heating is a function of the temperature, longer heating being required for maximum conversion at the lower temperature limits than at the higher temperatures.

The invention is further illustrated, but not limited, by the following examples:

*Example 1*

This example shows the preparation of 2-(dodecylmercapto)ethylamine under various conditions of temperature and pressure.

80 g. of 2-(tert-dodecylmercapto)ethyl chloride and about 75 ml. of liquid ammonia were charged to a steel autoclave which was maintained in Dry Ice. The autoclave was then sealed and heated to a temperature of 150° C. for a period of 6.5 hours. During this time a pressure of up to approximately 3500 p. s. i. was developed. The autoclave was then allowed to cool, its contents were removed, and the autoclave washed out with ether. Distillation of the combined washings and contents gave a fraction, B. P. 92 to 104° C./2 mm. (Mostly between 92 and 98° C./2 mm.)

In another run a mixture consisting of 79.0 g. of 2-(tert-dodecylmercapto)ethyl chloride and approximately 75 ml. of liquid ammonia was heated in the autoclave for a time of 8 hours at a temperature of 100° C. During this period the pressure rose to 700 p. s. i. Distillation of the product gave a fraction, B. P. 115 to 130° C./4 to 5 mm. This fraction was combined with the fraction B. P. 92 to 98° C./2 mm. obtained in the first run, and the combined material was refractionated to give 100.0 g. (60 percent theoretical yield) of the substantially pure 2-(dodecylmercapto)ethylamine, B. P. 123 to 128° C./3 to 4 mm., $n_D^{25}=1.4884$, giving a negative Beilstein halogen test and analyzing 5.73 percent nitrogen (calcd. for $C_{14}H_{31}SN$, 5.72 percent).

In still another run, 110 g. of the 2-(tert-dodecylmercapto)ethyl chloride and 75 ml. of liquid ammonia was heated in a rocking autoclave at a temperature of 80° C. during a period of 24 hours and a pressure of about 300 p. s. i. Distillation of the reaction product gave a lower yield (29.3 g.) of the 2-(tert-dodecylmercapto)ethylamine as well as 47.0 g. of a high boiling material which comprised higher substitution products, i. e. di- and tri-substituted amines.

*Example 2*

60 g. of 2-(n-butylmercapto)ethyl chloride and 75 ml. of liquid ammonia were charged to a pressure bomb, with cooling. The bomb was then sealed and heated to a temperature of 80° C. After heating for 12 hours the pressure vessel was cooled and the contents removed. Fractional distillation of the product gave a good yield of 2-(n-butylmercapto)ethylamine.

*Example 3*

100 g. of 2-[(2-phenylethyl)mercapto] ethyl chloride and approximately 125 ml. of liquid ammonia were charged to a pressure bomb maintained in Dry Ice. After sealing, the bomb was heated to a temperature of 150° C. for 12 hours under a pressure of from 2500 to 3000 p. s. i. with agitation by rocking back and forth. The bomb was then cooled and emptied, the product was washed with water and ether extracted. Removal of the ether from the extract and distillation of the residue gave a good yield of 2-[(2-phenylethyl)mercapto] ethylamine.

In like manner the following S-substituted mercaptoethyl halides or mercaptoisopropyl halides can be converted into the corresponding amines: 2-(cyclohexylmercapto)ethyl chloride, 2-[(1-naphthyl)mercapto] ethyl chloride, 2-(octadecylmercapto)-isopropyl chloride, 2-[(4-tolyl)mercapto] ethyl bromide, 2-[(2-ethylhexyl)-mercapto] ethyl bromide.

In making amines an excess of ammonia minimizes the formation of higher substitution products, i. e., di- and tri-substituted amines obtainable by reaction of 2 moles or 3 moles of the mercapto halides with one mole of ammonia. These higher substitution products are generally waxy to crystalline solids which may be advantageously used as lubricant additives, wax substitutes, etc. Hence, for some purposes, it may be desirable to limit the formation of the mono-substitution products by employing less ammonia. Also, with some of the lower molecular weight halides, in order to avoid other side reactions, for example dehydrohalogenation of the mercapto halide to yield a vinyl compound and possible subsequent polymerization of the vinyl compound, it may be necessary to operate at pressures substantially above those developed under the temperature conditions. Such excess pressure may be applied by introducing additional quantities of ammonia into the pressure vessel during the reaction.

What I claim is:

1. The process of preparing compounds having the general formula $$R-S-CH_2CHNH_2$$
$$\quad\quad\quad\quad\quad |$$
$$\quad\quad\quad\quad\quad Z$$

in which R is a member of the group consisting of alkyl, aryl, aralkyl and alicyclic radicals of from 1 to 18 carbon atoms, and Z is a member of the group consisting of hydrogen and the methyl radical which comprises treating with ammonia, mercapto halides having the general formula $$R-S-CH_2CHX$$
$$\quad\quad\quad\quad\quad |$$
$$\quad\quad\quad\quad\quad Z$$

in which R is a member of the group consisting of alkyl, aryl, aralkyl and alicyclic radicals of from 1 to 18 carbon atoms, Z is a member of the group consisting of hydrogen and the methyl radical and X is a member of the group consisting of chlorine and bromine at superatmospheric pressure of up to 4000 pounds per square inch and at temperatures of from 60° C. to 150° C.

2. The process of preparing compounds having the general formula $$Alk-S-CH_2CH_2NH_2$$

in which Alk is an alkyl radical of from 1 to 18 carbon atoms which comprises treating with ammonia mercapto chlorides having the general formula $$Alk-S-CH_2CH_2Cl$$

in which Alk is an alkyl radical of from 1 to 18 carbon atoms, at pressures of from 400 to 4000 pounds per square inch and at temperatures of from 60° C. to 150° C.

3. The process of preparing 2-(tert-dodecylmercapto)-ethylamine which comprises treating 2-(tert-dodecylmercapto)ethyl chloride with ammonia at superatmospheric pressures of from 400 to 4000 pounds per square inch and at temperatures of from 60° C. to 150° C.

4. The process of preparing 2-[(2-phenylethyl)mercapto] ethylamine which comprises treating 2-[(2-phenylethyl)mercapto] ethyl chloride with ammonia at pressures of from 400 to 4000 pounds per square inch and at temperatures of from 60° C. to 150° C.

5. The process of preparing 2-(n-butylmercapto)ethylamine which comprises treating 2-(n-butylmercapto)ethyl chloride with ammonia at pressures of from 400 to 4000 pounds per square inch and at temperatures of from 60° C. to 150° C.

References Cited in the file of this patent

UNITED STATES PATENTS

| | | |
|---|---|---|
| 2,086,585 | Taub et al. | July 13, 1937 |
| 2,186,392 | Reynhart | Jan. 9, 1940 |
| 2,187,723 | Alquist et al. | Jan. 23, 1940 |
| 2,336,465 | Buck et al. | Dec. 14, 1943 |
| 2,355,337 | Spence | Aug. 8, 1944 |
| 2,416,265 | MacMullen et al. | Feb. 18, 1947 |

FOREIGN PATENTS

| | | |
|---|---|---|
| 204,701 | Switzerland | Aug. 16, 1939 |

OTHER REFERENCES

Stevenson: Ind. and Eng. Chem., vol. 40, p. 1584 (1948).

Bernthsen et al.: "Textbook of Org. Chem.," D. Van Nostrand and Co., New York, 1931, pp. 90–91.